(12) United States Patent
Matsubara et al.

(10) Patent No.: US 8,381,764 B2
(45) Date of Patent: Feb. 26, 2013

(54) CHECK VALVE

(75) Inventors: Masaharu Matsubara, Nagano (JP); Yuichi Takeda, Matsumoto (JP)

(73) Assignees: Shinshu University (JP); Nippo Valve Company Ltd. (JP)

( * ) Notice: Subject to any disclaimer, the term of this patent is extended or adjusted under 35 U.S.C. 154(b) by 943 days.

(21) Appl. No.: 12/384,534

(22) Filed: Apr. 6, 2009

(65) Prior Publication Data

US 2009/0250123 A1    Oct. 8, 2009

(30) Foreign Application Priority Data

Apr. 7, 2008 (JP) ................................ 2008-099116

(51) Int. Cl.
*F16K 15/06* (2006.01)
(52) U.S. Cl. ................ 137/514.7; 137/220; 137/533.31; 137/542
(58) Field of Classification Search .................. 137/528, 137/535–538, 540, 542, 543, 533.31, 514.7, 137/220
See application file for complete search history.

(56) References Cited

U.S. PATENT DOCUMENTS

| | | | |
|---|---|---|---|
| 2,912,001 A | 11/1959 | Green |
| 3,134,394 A | 5/1964 | Ohta |
| 3,993,093 A | 11/1976 | Mokveld |
| 4,244,392 A | 1/1981 | Griswold |
| 4,244,395 A | 1/1981 | Griswold |
| 4,276,897 A | 7/1981 | Griswold |
| 4,333,495 A | 6/1982 | Griswold |
| 4,364,408 A | 12/1982 | Griswold |
| 4,452,272 A | 6/1984 | Griswold |
| 4,478,236 A | 10/1984 | Neuzeret |
| 4,638,832 A | 1/1987 | Mokveld |
| 4,747,426 A | 5/1988 | Weevers |

(Continued)

FOREIGN PATENT DOCUMENTS

| | | |
|---|---|---|
| CA | 1066164 | 11/1979 |
| DE | 2821255 | 11/1979 |

(Continued)

*Primary Examiner* — Kevin Lee
(74) *Attorney, Agent, or Firm* — Daniel P. Burke & Associates, PLLC

(57) ABSTRACT

A check valve (1) includes a casing (2) having a valve seat (10) formed in a flow path and a valving element assembly (21) disposed in the casing. A top (23) of a valving element (22) is received in a large-diameter portion (38) of a through-hole (37) in a support member (35) of the valving element assembly. A narrow flow path portion (68) is formed between an arcuate portion (46) of an outer periphery (45) of the support member and a second enlarged-diameter portion (11) of the casing. The narrow flow path portion (a first portion of an intermediate flow path) is communicated with a back-pressure chamber (50) defined in the support member at the rear of the top of the valving element through a communicating passage (67) including a gap (66) between the outer periphery of the valving element and the inner periphery of the large-diameter portion and grooves (27) on the rear surface of the top of the valving element. A low static pressure of fluid flowing through the narrow flow path portion is introduced into the back-pressure chamber. Fluid passing through the narrow flow path portion enters a diffuser flow path portion (69) as a second portion of the intermediate flow path and recovers the static pressure while flowing therethrough. Next, the fluid flows downstream through a uniform flow path portion as a third portion of the intermediate flow path while maintaining the recovered static pressure.

20 Claims, 5 Drawing Sheets

U.S. PATENT DOCUMENTS

| | | |
|---|---|---|
| 4,878,515 A | 11/1989 | Stevens |
| 4,895,180 A | 1/1990 | Vollmer |
| 5,921,276 A | 7/1999 | Lam |
| 6,769,450 B2 | 8/2004 | Fretwell |
| 7,293,576 B2 | 11/2007 | Royse |
| 8,136,547 B2 * | 3/2012 | Francini et al. ............... 137/540 |

FOREIGN PATENT DOCUMENTS

| | | |
|---|---|---|
| DE | 202004001540 | 5/2004 |
| GB | 815550 | 6/1959 |
| GB | 2021238 | 11/1979 |
| GB | 2188707 A | 10/1987 |
| JP | S50-83819 | 7/1975 |
| JP | Sho 54-150723 | 11/1979 |
| JP | S55-27576 | 2/1980 |
| JP | Sho-63-1871 | 1/1988 |
| JP | Hei-10-288265 | 10/1998 |
| JP | Hei-11-153300 | 6/1999 |
| WO | 89/10509 | 11/1989 |

* cited by examiner

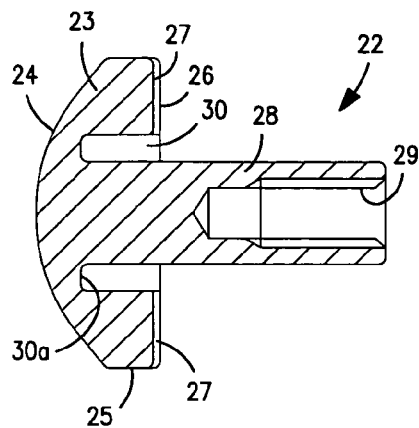
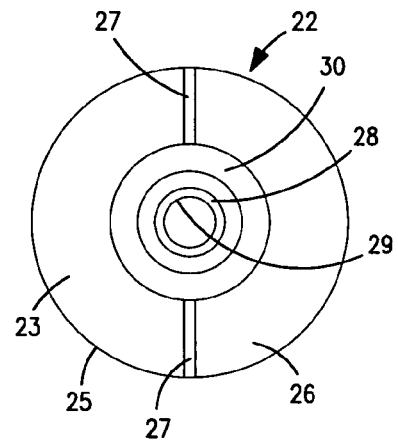
FIG. 3A   FIG. 3B
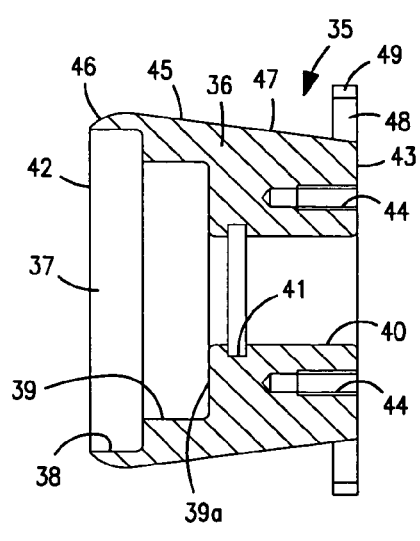
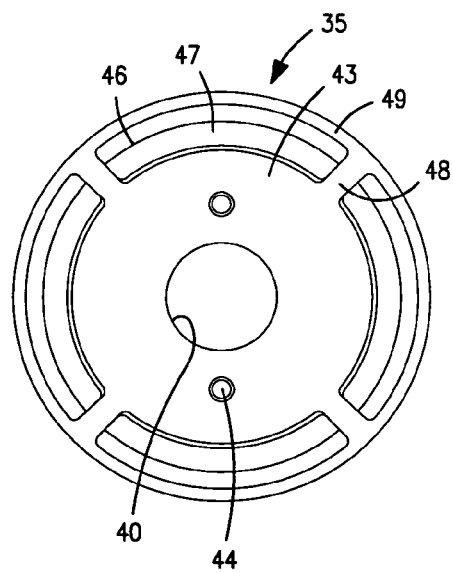
FIG. 4A   FIG. 4B

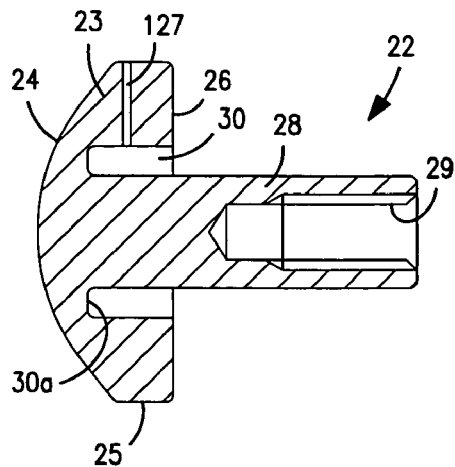
FIG. 5
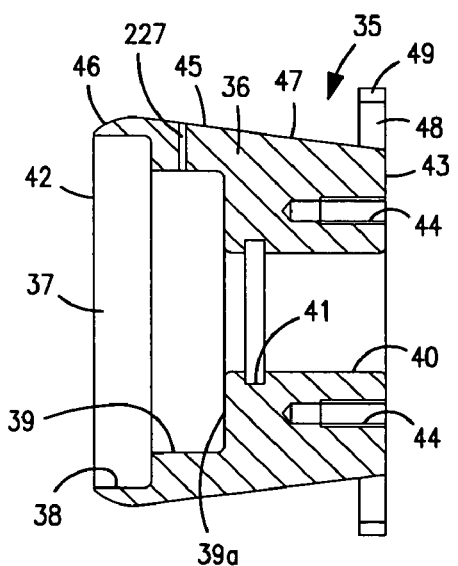 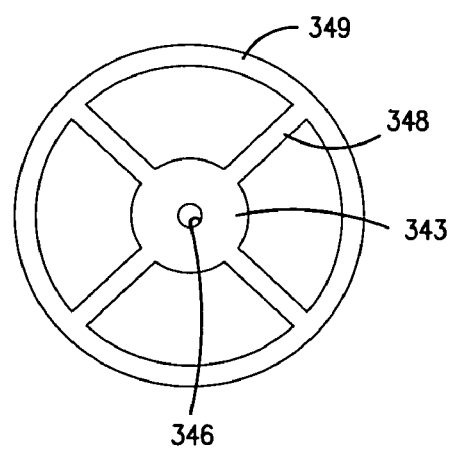
FIG. 6  FIG. 8

CHECK VALVE

BACKGROUND OF THE INVENTION

1. Technical Field

The present invention relates to check valves and, more particularly, to a check valve capable of reducing pressure losses in comparison to conventional check valves and hence capable of greatly reducing the fluid pressure reduction at the downstream side.

2. Background Art

There has heretofore been proposed a spring-loaded check valve in which a valving element is urged toward a valve seat by a compression spring or other urging member, and when the supply of fluid is stopped, the valving element is pressed against the valve seat by the force of the spring to prevent back flow.

In the conventional check valve of this type, the valving element is urged toward the valve seat by using a spring as stated above. Therefore, it is necessary in order to open the valve to move the valving element by compressing the spring. Incidentally, when fluid flows through a pipe, pressure losses are produced by pipe friction occurring between the fluid and the pipe wall and a turbulent flow generated by an object put in the flow. If a check valve is installed, the flow path area is reduced to a considerable extent when fluid flows between the valving element and the valve seat. As a result, the pipe friction increases. In general, there is a large change in configuration at the rear side of the valving element. Therefore, a turbulent flow is generated at the rear side of the valving element. The valve opening of the valving element is determined by a differential pressure caused by these pressure losses, i.e. a difference between pressures acting on the upstream and downstream sides of the valving element. In this regard, large pressure losses require a correspondingly large amount of energy to send fluid in the forward direction, for example. Accordingly, how to reduce these pressure losses has been an issue for many years, and various schemes have heretofore been proposed.

Japanese Patent Application Publication No. Hei 10-288265 discloses one example of such conventional schemes. In the invention disclosed in this JP publication, a main valving element and an auxiliary valving element are provided and acted upon by respective springs serving as urging members, and a rectifying passage is provided for each of the two valving elements to reduce the occurrence of turbulent flow, thereby reducing the pressure losses. In this case, however, the cross-sectional area of the rectifying passage is small. Therefore, when fluid flowing through the rectifying passage enters a valve chamber having a much larger cross-sectional area than the rectifying passage, the flow of fluid is disordered to a considerable extent, resulting in a turbulent flow. Because the auxiliary valving element is a plate-shaped member, a friction occurs when fluid flows between the valve seat and the valving element, and a turbulent flow is generated when fluid flows toward the rear of the valving element. Thus, the invention disclosed in Japanese Patent Application Publication No. Hei 10-288265 cannot be said to have attained a satisfactory reduction of pressure losses.

SUMMARY OF THE INVENTION

Accordingly, an object of the present invention is to provide a check valve capable of greatly reducing pressure losses by moving a valving element with an increased differential pressure different from the differential pressure between the upstream and downstream side pressures, which has heretofore been used to act on the valving element.

According to a first aspect thereof, the present invention provides a check valve including a casing, a valving element, and an urging member, wherein the casing has a flow path formed therein and a valve seat formed at an intermediate portion of the flow path, the valving element is disposed in the flow path, the valving element is movable in a flow direction in the flow path to selectively seat on and unseat from the valve seat at one end thereof, and the urging member urges the valving element toward the valve seat, and wherein the check valve further includes a back-pressure chamber that movably receives at one end thereof at least the other end of the valving element. The other end of the back-pressure chamber is closed. Further, the check valve includes a narrow flow path portion of small flow path area formed over a desired range in the flow direction at the downstream side of a position at which the valving element abuts against the valve seat. One end of the narrow flow path portion is brought into and out of communication with the upstream side of the flow path in response to the valving element unseating from and seating on the valve seat. The other end of the narrow flow path portion is constantly in communication with the downstream side of the flow path. Further, the check valve includes a communicating passage that communicates between the narrow flow path portion and the back-pressure chamber.

The check valve may further include a diffuser flow path portion that is substantially contiguous with the downstream side end of the narrow flow path portion. The diffuser flow path portion gradually increases in flow path area toward the downstream side thereof.

The check valve may further include a uniform flow path portion that is substantially contiguous with the downstream side end of the diffuser flow path portion. The uniform flow path portion has a uniform flow path area.

According to a second aspect thereof, the present invention provides a check valve including a casing, a valving element, and an urging member, wherein the casing has a flow path formed therein and a valve seat formed at an intermediate portion of the flow path, the valving element is disposed in the flow path, the valving element is movable in a flow direction in the flow path to selectively seat on and unseat from the valve seat at one end thereof, and the urging member urges the valving element toward the valve seat, wherein the check valve further includes a substantially circular cylindrical valving element support fixedly disposed in the flow path. The valving element support has at one end thereof a recess that movably receives at least the other end of the valving element. Further, the check valve includes an intermediate flow path formed between the outer periphery of the valving element support and the inner periphery of the casing that faces the outer periphery. The intermediate flow path communicates between the upstream and downstream sides of the flow path when the valving element unseats from the valve seat. Further, the check valve includes a communicating passage that communicates the intermediate flow path with the recess.

The check valve may be arranged as follows. The intermediate flow path has a first portion extending over a predetermined range from the one end of the valving element support. The outer periphery of the valving element support and the inner periphery of the casing are closer to each other at the first portion than at the rest of the intermediate flow path. The communicating passage communicates between the first portion and the recess.

Further, the check valve may be arranged as follow. The intermediate flow path has a second portion that is substantially contiguous with the first portion. At the second portion, the outer periphery of the valving element support and the inner periphery of the casing are gradually spaced away from each other toward the downstream side of the flow path.

Further, the check valve may be arranged as follows. The intermediate flow path has a third portion that is substantially contiguous with the second portion. The third portion has a substantially uniform flow path area throughout its length.

Further, the check valve may be arranged as follows. The valving element has a top having an outer periphery that faces the inner periphery of the recess of the valving element support. A gap is provided between the inner periphery of the recess and the outer periphery of the top of the valving element. The gap constitutes the communicating passage.

Further, the check valve may be arranged as follows. The top of the valving element has a groove formed on the rear side thereof. The groove extends radially of the top to communicate with the gap at an outer end thereof. The groove constitutes a part of the communicating passage.

Further, the check valve may be arranged as follows. The outer periphery of the valving element support has a first portion formed along an outwardly convex circular arc, a second portion that is substantially smoothly contiguous with the first portion and that gradually decreases in diameter toward the downstream side of the flow path, and a third portion that is substantially conical and substantially smoothly contiguous with the second portion.

According to a third aspect thereof, the present invention provides a check valve including a casing, a valving element, and an urging member, wherein the casing has a flow path formed therein and a valve seat formed at an intermediate portion of the flow path, the valving element is disposed in the flow path, the valving element is movable in a flow direction in the flow path to selectively seat on and unseat from the valve seat at one end thereof, and the urging member urges an upstream portion of the valving element toward the valve seat, and wherein the valving element has a substantially artillery shell-shaped configuration and is circular in section at any position in the axial direction thereof. As used herein, the term "artillery shell-shaped" is used to indicate that the portion of the valving element downstream of the position where the valving element contacts the valve seat, tapers gradually inwardly. The angle of the taper is preferably gradual over one or more portions of the longitudinal length of the valving element and preferably terminates at the downstream end in a streamlined, rounded portion. The valving element has a first external portion formed along an outwardly convex circular arc proximate a portion thereof that abuts against the valve seat when the valving element seats on the valve seat. The valving element gradually decreases in outer diameter over a range of a predetermined length from the downstream side end of the first external portion and converges at the downstream side end thereof.

ADVANTAGEOUS EFFECTS OF INVENTION

In the check valve according to the first or second aspect of the present invention, when the valving element is open and fluid flows, the static pressure thereof reduces to a considerable extent when the fluid passes through the narrow flow path portion or the intermediate flow path. The static pressure reduced considerably is introduced into the back-pressure chamber or the recess that receives the rear side of the valving element. Therefore, the difference between fluid pressures acting on the front and rear surfaces of the valving element increases in comparison to the conventional check valve. Accordingly, the valve opening can be increased as compared to the conventional check valve for the same conditions regarding the fluid pressure at the upstream side, the spring used, and so forth. Thus, the valve opening becomes larger than that of the conventional check valve even in a case where the degree of opening of the faucet at the downstream side is the same, i.e. the flow rate is the same. Consequently, the flow velocity of fluid passing through the valve seat portion reduces to a considerable extent, and the pipe friction at the valve seat portion decreases, resulting in a considerable reduction of pressure losses.

In a case where a diffuser flow path portion is provided contiguously with the narrow flow path portion, or in a case where a second portion of the intermediate flow path is provided contiguously with the first portion thereof, the static pressure once reduced to a considerable extent can be surely recovered. Accordingly, the pressure reduction at the downstream side can be surely reduced.

If a uniform flow path portion or a third portion, which has a uniform flow path area, is provided contiguously with the diffuser flow path portion or the second portion, fluid is allowed to flow downstream while maintaining the recovered pressure.

Further, fluid flows smoothly if the outer periphery of the valving element support is formed from a first portion formed along an outwardly convex circular arc, a second portion that is smoothly contiguous with the first portion and that gradually decreases in diameter toward the downstream side of the flow path, and a third portion that is substantially conical and smoothly contiguous with the second portion. Accordingly, it is possible to prevent the generation of a turbulent flow and the like. Thus, the pressure losses can be reduced.

In the check valve according to the third aspect of the present invention, the valving element has a substantially artillery shell-shaped configuration and is circular in section at any position in the axial direction thereof. The illustrated valving element tapers gradually over two portions of the longitudinal length of the valving element, the first defined by the support member 35 and the second portion defined by the outer surface of the spacer 51. The valving element has a first external portion formed along an outwardly convex circular arc proximate a portion thereof that abuts against the valve seat. The valving element gradually decreases in outer diameter over a range of a predetermined length from the downstream side end of the first external portion and converges at the downstream side end thereof. Accordingly, a diffuser can be formed by properly shaping the inner periphery of the casing. Thus, it is possible to prevent the generation of a turbulent flow and the like and to recover considerably the static pressure reduced when fluid passes through the valve seat portion. As a result, the pressure losses can be reduced as compared to the conventional check valve.

Other objects and advantages of the present invention will become apparent from the following detailed description of illustrated embodiments of the invention.

BRIEF DESCRIPTION OF THE DRAWINGS

FIGS. 3A and 3B are a longitudinal sectional view and a right side view, respectively, of a valving element used in the check valve shown in FIG. 1.

FIGS. 4A and 4B are a longitudinal sectional view and a right side view, respectively, of a valving element support member used in the check valve shown in FIG. 1.

FIG. 5 is a longitudinal sectional view of a valving element of a second embodiment of the present invention.

FIG. 6 is a longitudinal sectional view of a valving element support member of a third embodiment of the present invention.

FIG. 8 is a right side view of the guide member of the embodiment of the present invention shown in FIG. 7.

DETAILED DESCRIPTION OF THE PREFERRED EMBODIMENTS

Figure 1:
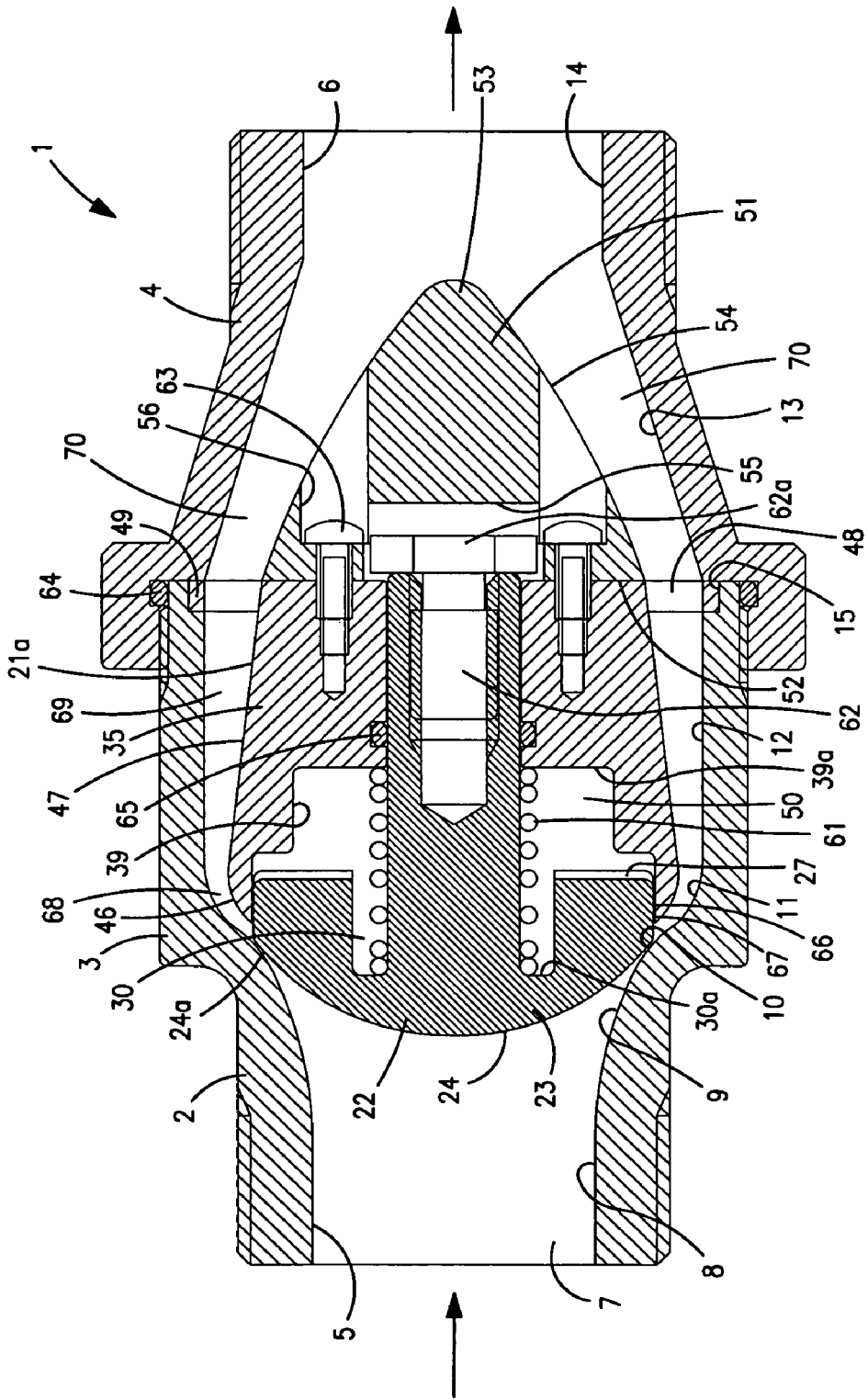
FIG. 1 is a longitudinal sectional view showing a check valve according to an embodiment of the present invention that is in a water stop position.
Figure 2:
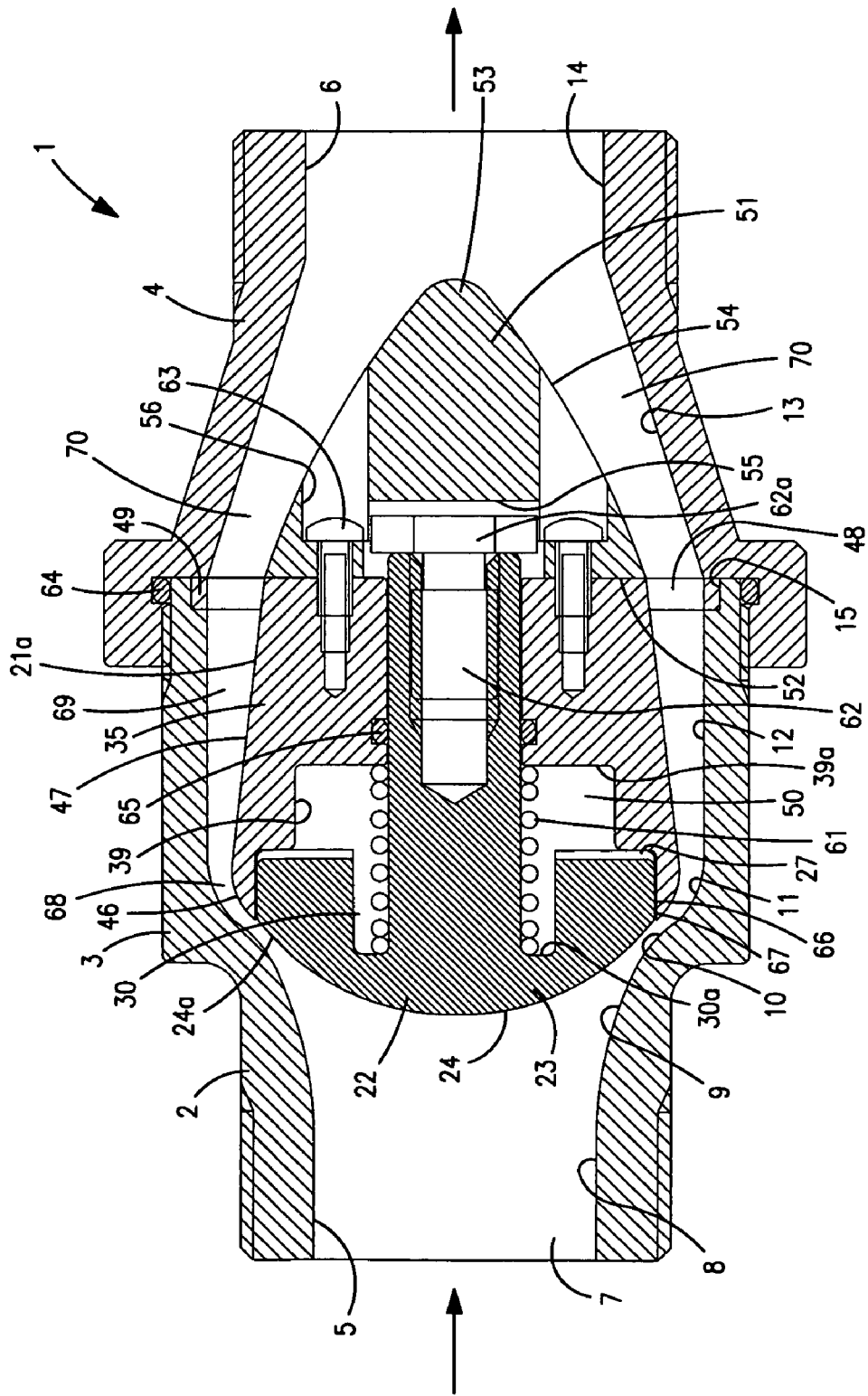
FIG. 2 is a longitudinal sectional view showing the check valve of FIG. 1 that is in a water supply position.

Embodiments of the present invention will be described below with reference to the accompanying drawings. FIGS. 1 and 2 are longitudinal sectional views showing a check valve 1 according to an embodiment of the present invention. FIG. 1 shows the check valve 1 in a closed position. FIG. 2 shows the check valve 1 in an open position. First, the arrangement of the check valve 1 will be explained with reference to FIG. 1.

In FIG. 1, a casing 2 comprises a casing body 3 and a retaining member 4 connected to the casing body 3 by thread engagement in this embodiment. The retaining member 4 is a member for installing a valving element assembly 21 (described later) inside the casing 2. The casing 2 is hollow throughout the body 3 and the retaining member 4 to form a through-hole 7. The through-hole 7 has openings at opposite ends thereof that are used as an inlet port 5 and an outlet port 6 when water flows in the forward direction, for example.

The through-hole 7 in the casing 2 has the following configuration. The through-hole 7 has a first uniform-diameter portion 8, a first enlarged-diameter portion 9, a valve seat portion 10, a second enlarged-diameter portion 11, a second uniform-diameter portion 12, a reduced-diameter portion 13, and a third uniform-diameter portion 14. The first uniform-diameter portion 8 extends from the inlet port 5 over a range of a predetermined length in the axial direction of the casing 2 and has a uniform inner diameter throughout its length. The first enlarged-diameter portion 9 extends contiguously from the first uniform-diameter portion 8 and gradually increases in diameter along a circular arc with a relatively large diameter that is convex inwardly of the through-hole 7. The valve seat portion 10 is formed along a small-diameter circular arc, which is substantially smoothly contiguous with the first enlarged-diameter portion 9. The second enlarged-diameter portion 11 gradually increases in diameter along a circular arc that is convex in the direction opposite to that of the first enlarged-diameter portion 9 and that has a diameter larger than the valve seat portion 10 and smaller than the first enlarged-diameter portion 9. The second uniform-diameter portion 12 extends contiguously from the second enlarged-diameter portion 11. The reduced-diameter portion 13 extends contiguously from the second uniform-diameter portion 12 and gradually decreases in diameter along a taper with a predetermined angle. The third uniform-diameter portion 14 extends contiguously from the reduced-diameter portion 13 to the outlet port 6 and has the same diameter as the first uniform-diameter portion 8.

The following is an explanation of the valving element assembly 21 installed in the casing 2. The valving element assembly 21 mainly comprises a valving element 22, a valving element support member 35 that receives the valving element 22 at one end thereof and that guides movement of the valving element 22, a spacer 51 secured to the valving element support member 35 at an end thereof opposite to the valving element 22, and a spring (compression spring) 61 serving as an urging member that urges the valving element 22. The valving element support member 35 and the spacer 51 are integrated into a valving element support 21a.

The valving element 22 will be explained below with reference to FIGS. 3A and 3B, which are a sectional view and a right side view, respectively, in addition to FIGS. 1 and 2. As shown in these figures, the valving element 22 has a substantially mushroom-shaped configuration. That is, the valving element 22 has a top 23 having a front surface 24 with an arcuate sectional configuration and an outer peripheral portion 25 with a predetermined height. The valving element 22 further has a stem 28 projecting rearward from the center of a rear surface 26 of the top 23. The stem 28 has an axially extending internal thread 29 formed at the rear side thereof. The rear surface 26 of the top 23 has a circumferential groove 30 formed at the base of the stem 28 and further has grooves 27 radially extending from the outer peripheral portion 25 to the circumferential groove 30. In this embodiment, two grooves 27 are formed being circumferentially spaced from each other by 180 degrees.

Next, the valving element support member (hereinafter referred to simply as "support member") 35 will be explained with reference to FIGS. 4A and 4B, which are a sectional view and a right side view, respectively, in addition to FIGS. 1 and 2. The support member 35 has a body portion 36 having a substantially circular cylindrical configuration. A through-hole 37 axially extending through the body portion 36 comprises, in order from the left side in FIG. 4A, a large-diameter portion 38 having the largest diameter, an intermediate-diameter portion 39 formed next to the large-diameter portion 38, and a small-diameter portion 40 of the smallest diameter that is formed next to the intermediate-diameter portion 39. The small-diameter portion 40 has a circumferential groove 41 formed at a position close to the intermediate-diameter portion 39 to receive an O-ring for sealing (described later). Meanwhile, two internal threads 44 are formed on the other end surface 43 of the body portion 36.

The outer periphery 45 of the body portion 36 of the support member 35 has the following configuration. The outer periphery 45 comprises an arcuate portion 46 and a tapered portion 47. The arcuate portion 46 extends over a relatively short range at one end surface 42 of the body portion 36 along an outwardly convex circular arc. More specifically, the arcuate portion 46 gradually increases in diameter and thereafter slightly decreases in diameter. The tapered portion 47 extends in the direction of a line tangent to the terminating end of the arcuate portion 46. The tapered portion 47 gradually decreases in diameter toward the other end surface 43 of the body portion 36. The other end surface 43 of the body portion 36 is provided with four ribs 48 extending outward from the outer periphery 45. The ribs 48 have the same length and are equally spaced from each other in the circumferential direction. The respective outer ends of the ribs 48 are connected to an annular portion 49.

The spacer 51 is substantially conical in shape and has a flat bottom surface 52 that corresponds in shape and size to the other end surface 43 of the support member 35 and that is placed on the other end surface 43 when the spacer 51 and the support member 35 are assembled together. The spacer 51 further has a top 53 formed with an arcuate sectional configuration and an outer peripheral portion 54 formed along an outwardly convex circular arc in section that has a large radius of curvature so that the outer peripheral portion 54 gradually decreases in diameter from the bottom surface 52 toward the top 53. The bottom surface 52 has a recess 55 formed at a position corresponding to the through-hole 37 of the support member 35. The recess 55 has a diameter slightly larger than the diameter of the small-diameter portion 40 of the through-hole 37. The outer peripheral portion 54 has bolt-fitting holes 56 formed at respective positions corresponding to the internal threads 44 of the support member 35. Each bolt-fitting hole 56 is a stepped hole having two different inner diameters, into which a mounting bolt 63 (described later) is to be fitted. As illustrated in the figures, the recess 55 and the bolt-fitting holes 56 partially interfere with each other configurationally. Thus, the respective insides of the recess 55 and the bolt-fitting holes 56 communicate with each other.

Here, let us explain the assembly of the check valve 1. As shown in FIG. 2, the valving element 22 is received in the large-diameter portion 38 of the through-hole 37 of the support member 35 at the rear surface 26 side of the top 23 thereof. The stem 28 of the valving element 22 is axially movably fitted in the small-diameter portion 40 of the through-hole 37. The compression spring 61 serving as an urging member is disposed around the stem 28 of the valving element 22. The opposite ends of the compression spring 61 respectively abut against the bottom 30a of the circumferential groove 30 of the valving element 22 and the bottom 39a of the intermediate-diameter portion 39 of the support member 35 to urge the valving element 22 leftward in FIG. 2, i.e. toward the valve seat portion 10. Meanwhile, a bolt 62 is engaged with the internal thread 29 of the stem 28 of the valving element 22. Because the top 62a of the bolt 62 positioned in the recess 55 of the spacer 51 is larger in diameter than the small-diameter portion 40 in which the stem 28 is fitted, the valving element 22 cannot come out of the support member 35. It should be noted that the diameter of the outer peripheral portion 25 of the top 23 of the valving element 22 is somewhat smaller than the inner diameter of the large-diameter portion 38 of the support member 35. Therefore, there is a narrow gap 66 between the outer peripheral portion 25 and the large-diameter portion 38.

Next, the spacer 51 is secured to the support member 35 by using mounting bolts 63. The valving element assembly 21 thus constructed is inserted into the body 3 of the casing 2 as illustrated in the figures. The annular portion 49 of the support member 35 is fitted into a groove 15 formed on the inner periphery of an end of the casing body 3, and in this state, the retaining member 4 is connected to the casing body 3 by thread engagement as illustrated in the figures. Reference numeral 64 denotes an O-ring that fluid-tightly seals the joint between the casing body 3 and the retaining member 4. Reference numeral 65 denotes an O-ring that fluid-tightly seals between the stem 28 of the valving element 22 and the small-diameter portion 40 of the through-hole 37 of the body portion 36.

FIG. 1 shows a state where the check valve 1 is closed as stated above, i.e. a position assumed by the check valve 1 as installed in the piping of a water supply system, for example, when the water supply is stopped by closing a faucet at the downstream side, for example. The valving element 22 is urged by the spring 61 to seat on the valve seat portion 10 at a valve seat abutting portion 24a of the front surface 24 thereof.

In this state, an annular narrow flow path portion 68 having a narrow cross-sectional area, i.e. flow path area, is defined between the arcuate portion 46 of the support member 35 and the second enlarged-diameter portion 11 of the casing 2. The narrow flow path portion 68 forms a first portion of an intermediate flow path between the upstream and downstream flow paths. A diffuser flow path portion 69 is formed between the tapered portion 47 of the support member 35 and the second uniform-diameter portion 12 of the casing 2. The diffuser flow path portion 69 is substantially contiguous with the narrow flow path portion 68. The diffuser flow path portion 69 forms a second portion of the intermediate flow path and gradually increases in flow path area. The flow path area of the diffuser flow path portion 69 at the downstream end thereof (i.e. the position corresponding to the right end of the support member 35) is substantially the same as the flow path area at the outlet port 6. In addition, a uniform flow path portion 70 is defined between the outer peripheral portion 54 of the spacer 51 and the reduced-diameter portion 13 of the casing 2. The uniform flow path portion 70 forms a third portion of the intermediate flow path. The uniform flow path portion 70 extends contiguously with the third uniform-diameter portion 14 while maintaining its flow path area equal to the area at the outlet port 6 and is in communication with the outlet port 6. As has been stated above, a gap 66 is provided between the outer peripheral portion 25 of the top 23 of the valving element 22 and the inner periphery of the large-diameter portion 38 of the support member 35, and the rear surface 26 of the top 23 is formed with grooves 27. The gap 66 and the grooves 27 constitute in combination a communicating passage 67 that provides communication between a space formed between the large-diameter portion 38 and the intermediate-diameter portion 39, i.e. a back-pressure chamber 50, and the narrow flow path portion 68. The back-pressure chamber 50 is acted upon by the pressure of water at the outlet port 6, i.e. the downstream water pressure. The water pressure in the back-pressure chamber 50 acts on the rear surface 26 of the top 23 of the valving element 22.

FIG. 2 is a sectional view showing the check valve 1 in a water supply state where water is flowing as a result of the downstream-side faucet being opened. That is, when the downstream-side faucet is opened in the state shown in FIG. 1, the downstream-side water pressure reduces. Consequently, the water pressure in the back-pressure chamber 50 also reduces, resulting in a reduction of the pressure acting on the rear surface 26 of the valving element 22. Accordingly, the valving element 22 moves rightward in the figure against the force of the spring 61 to unseat from the valve seat portion 10. Thus, the valve 1 opens.

As a result of the valving element 22 unseating from the valve seat portion 10, water flows downstream through the gap between the valving element 22 and the valve seat portion 10. In this case, due to the difference in sectional area among the various portions of the flow path, the flow velocity at the above-described narrow flow path portion 68 is very high as compared to the flow velocities at the other portions. Therefore, the static pressure of water at the narrow flow path portion 68 is very low in comparison to the other portions. Because this low static pressure acts on the back-pressure chamber 50 through the above-described communicating passage 67, the differential pressure between the water pressures acting on the front and rear surfaces 24 and 26, respectively, of the valving element 22 is very large in comparison to the conventional check valve in which the downstream-side water pressure acts on the rear surface of the valving element. Accordingly, the valve opening of the valving element 22 increases in comparison to the conventional valve structure for the same conditions regarding the initial pressure at the upstream side, the degree of opening of the downstream-side faucet, the spring used, and so forth, and the pressure losses at the valving element 22 reduce to a considerable extent.

After passing through the narrow flow path portion 68, the flow of water enters the diffuser flow path portion 69. Because the diffuser flow path portion 69 gradually increases in flow path area toward the downstream side, as has been stated above, the static pressure is gradually recovered. Next, the flow of water enters the uniform flow path portion 70. The uniform flow path portion 70 has a uniform flow path area and has a smoothly converging configuration. Therefore, water flows through the uniform flow path portion 70 while maintaining the static pressure recovered in the diffuser flow path portion 69 substantially as it is, and reaches the outlet port 6. In this connection, it should be noted, as stated above, the flow path area of the diffuser flow path portion 69 at the downstream end thereof is substantially the same as the flow path area at the outlet port 6 and the inlet port 5 and the outlet port 6 have the same diameter. Therefore, the static pressure at the inlet port 5 is substantially recovered when water reaches the end of the diffuser flow path portion 69. It is desirable that the uniform flow path portion 70 is provided since it is possible for water to flow toward the downstream, maintaining the recovered static pressure. However, for example, in the cases where the total length of the casing 2 is limited, the uniform flow path portion 70 may be omitted, taking into consideration pressure losses that may occur.

The flow rate is determined according to the degree of opening of the faucet at the downstream side. Therefore, the flow velocity of water when passing through the narrow flow path portion 68 also varies according to the opening of the downstream-side faucet. The static pressure acting on the back-pressure chamber 50 changes according to the flow rate. In general, the higher the flow rate, the lower the static pressure acting on the back-pressure chamber 50 and the larger the differential pressure acting on the valving element 22. Hence, the valve opening of the valving element 22 increases as the flow rate increases. When the flow rate exceeds a certain level, the rear surface 26 of the valving element 22 abuts against the bottom of the large-diameter portion 38 of the support member 35 to limit further movement of the valving element 22. Thus, the valve opening of the valving element 22 reaches 100 percent. The valve opening, however, may not reach 100 percent when the flow rate is low. In either case, the difference between water pressures acting on the valving element 22 from both sides increases in comparison to the conventional valve structure. Hence, the valve opening of the valving element 22 increases, and the pressure losses reduce. It should be noted that the distal end of the stem 28 of the valving element 22 extends into the recess 55 of the spacer 51 and is therefore acted upon by the water pressure at the downstream side; however, the influence of the downstream-side water pressure is small because the pressure-receiving area of the end of the stem 28 is much smaller than the rear surface 26 of the top 23 of the valving element 22.

When the faucet at the downstream side is closed, the back pressure acting on the rear surface 26 of the valving element 22 increases, so that the valving element 22 that is constantly urged toward the valve seat portion 10 by the force of the spring 61 is seated on the valve seat portion 10. At this time, the static pressure acting on the back-pressure chamber 50 becomes equal to the downstream-side water pressure again. It should be noted that when the valve opening of the valving element 22 is 100 percent, the rear surface 26 of the valving element 22 abuts against the bottom of the back-pressure chamber 50, i.e. the bottom 39a of the intermediate-diameter portion 39. In this case, however, the valving element 22 can return without any problem because, even in this state, the back-pressure chamber 50 is in communication with the narrow flow path portion 68 through the grooves 27 provided on the rear surface 26 of the valving element 22 as stated above. In addition, although the distal end of the stem 28 of the valving element 22 extends into the recess 55 of the spacer 51, the valving element 22 can move without any problem because the recess 55 is not closed but communicated with the downstream side through the bolt-fitting holes 56 as stated above.

The respective outer peripheries of the support member 35 and the spacer 51 smoothly change in diameter, and these two members are smoothly connected together at the joint therebetween. Further, the spacer 51 is in the shape of a substantially circular cone and has its top 53 positioned at the center of the downstream-side flow path, i.e. at the center of the third uniform-diameter portion 14 of the casing 2. Therefore, the flow of water flowing around the support member 35 and the spacer 51 is very smooth. Thus, separation of the flow of water is prevented. In this regard also, the pressure losses are reduced. Further, as will be clear from FIG. 2, the front surface 24 of the valving element 22 is configured so that, when the valving element 22 is fully open, the front surface 24 is substantially contiguous to the arcuate portion 46 of the support member 35 across the gap 66 along substantially the same circular arc. Accordingly, the flow of water is smooth. In this regard also, the pressure losses are reduced.

In the above-described embodiment, the communicating passage 67 that communicates between the narrow flow path portion 68 and the back-pressure chamber 50 comprises the gap 66 between the valving element 22 and the inner periphery of the large-diameter portion 38 of the support member 35 and the grooves 27 formed on the rear surface 26 of the valving element 22. The communicating passage, however, may be a hole 127 extending through the top 23 of the valving element 22 as shown in FIG. 5 or a hole 227 extending through the support member 35 as shown in FIG. 6.

Figure 7:
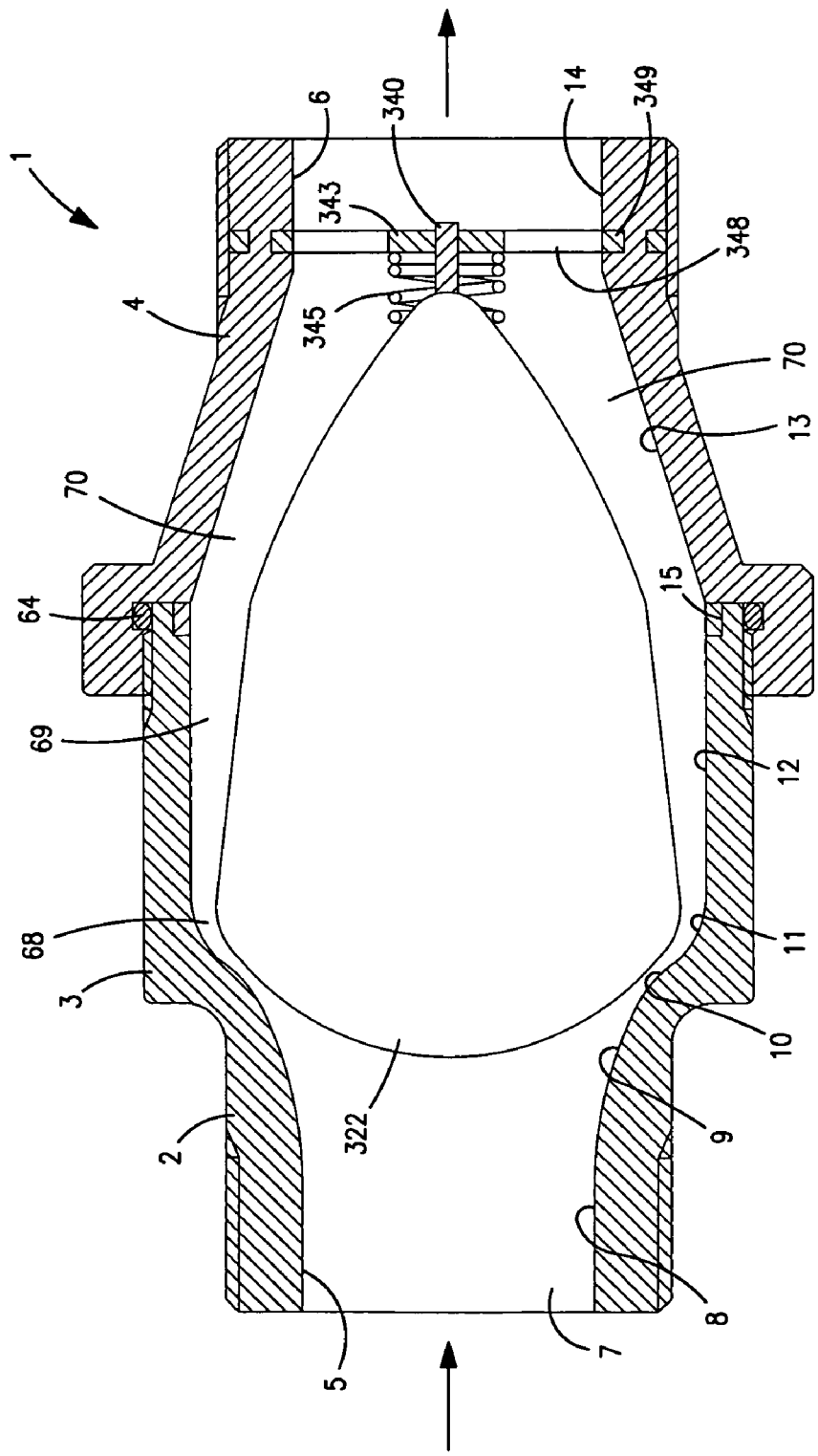
FIG. 7 is a longitudinal sectional view showing a check valve according to a fourth embodiment of the present invention in a water supply position.

Next, a fourth embodiment of the present invention will be explained with reference to FIGS. 7 and 8 where like numbers correspond to the structure shown above in FIG. 2. A check valve according to the fourth embodiment generally encompasses structure similar to that of the valving element 22, the body portion 36 of the support member 35 and the spacer 51 as shown in FIG. 2. In the fourth embodiment, these members are integrated into a solid valving element 322 having a substantially artillery shell-shaped configuration. The valving element 322 does not have the communicating passage 67 and the back-pressure chamber 50. The valving element has a valve stem 340 with an appropriate diameter that is provided at the pointed end of a portion thereof corresponding to the spacer 51 of FIG. 2. Further, as shown in FIGS. 7 and 8, the valving element 322 is provided with a guide member comprising an outer annular portion 349, an inner annular portion 343 and radially extending ribs 348 that connect together the outer and inner annular portions. That is, the guide member has a structure comprising an inner annular portion, an outer annular portion similar to the annular portion 49 and ribs similar to the ribs 48. The valving element 322 is secured to the retaining member 4 at the outer annular portion. The above-mentioned valve stem 340 is fitted into and guided by a hole 346 in the inner annular portion 343. A compression spring 345 is disposed between the guide member and the valving element 322. The check valve of this embodiment is similar to a conventional check valve in that the valving element is opened by a differential pressure between pressures acting on the upstream and downstream sides of the valving element. In this embodiment, however, a diffuser flow path portion 69 that smoothly increases in flow path area is formed. Therefore, it is possible to prevent the generation of a turbulent flow in the diffuser flow path portion 69 and to recover the static pressure reduced during passing through the gap between the valving element and the valve seat portion, as will be clear from the description made in connection with the first embodiment. In addition, the check valve has a uniform flow path portion 70 that smoothly converges at the center of the downstream-side flow path while maintaining its uniform flow path area. Therefore, it is possible to prevent the generation of a turbulent flow in the uniform flow path portion 70. Accordingly, the pressure losses become much smaller than in the conventional check valve.

What is claimed is:

1. A check valve comprising:
a casing having a flow path formed therein and a valve seat formed at an intermediate portion of said flow path;
a valving element disposed in said flow path, said valving element being movable in the flow path to selectively seat on and unseat from said valve seat,
an urging member that urges said valving element toward said valve seat,
said check valve further comprising;
a substantially circular cylindrical valving element support fixedly disposed centrally in said flow path downstream of the valve seat, said valving element support movably supporting said valving element, and
an intermediate flow path which is annular in section formed between an outer periphery of said valving element support and an inner periphery of said casing,
wherein said valving element comprises:
a head portion comprising a top portion for seating on and unseating from said valve seat, said head portion also comprising a column portion extending in the downstream direction,
wherein said valving element support comprises;
a recess comprising a mouth at an upstream portion of said valving element support which movably receives said column portion of said valving element, said recess comprising an inside portion extending behind at least a portion of said head portion of the valving element;
wherein said intermediate flow path comprises a narrow flow path portion extending from said mouth of said recess toward the downstream side, said narrow flow path portion being narrower than the rest of said intermediate flow path in the flow path area which is downstream of said narrow flow path portion,
said check valve further comprising;
a communicating passage formed between an inner periphery of said recess and an outer periphery of said column portion of the valving element, said communicating passage extending from said mouth of said recess and connecting said narrow flow path portion of the intermediate flow path to said inside portion of the recess.

2. A check valve according to claim 1, wherein
said column portion comprises a rear surface;
said recess formed in the valving element support comprises:
a first recess portion on the mouth side of the recess having a diameter and at least one bottom surface, and
a second recess portion adjacent to said first recess portion and having a diameter smaller than the diameter of the first recess portion; and
wherein, when said valving element is fully moved and fully opened, the rear surface of said column portion of the valving element abuts against a bottom surface of the first recess portion so that the further movement of the valving element in the downstream direction is prevented, and
wherein said rear surface of the column portion of the valving element and said bottom surface of the first recess portion are arranged such that, when the valving element is fully opened, an auxiliary communicating passage extending in the radial direction of said valving element is defined between said rear surface of the column portion and said bottom surface of the first recess portion to connect said communicating passage with the inside of said second recess portion.

3. A check valve according to claim 2, wherein said communicating passage comprises a gap provided between an inner periphery of the first recess portion and an outer periphery of the column portion.

4. A check valve according to claim 3, wherein said auxiliary communicating passage comprises a groove formed in the rear surface of the column portion of the valving element or in the bottom surface of the first recess portion.

5. A check valve according to claim 4, wherein said auxiliary communicating passage comprises a groove formed in the rear surface of the column portion of the valving element.

6. A check valve according to claim 2, wherein said communicating passage comprises a gap provided between an inner periphery of the recess and an outer periphery of the column portion.

7. A check valve according to claim 1, wherein said auxiliary communicating passage comprises a groove formed in the rear surface of the column portion of the valving element or in the bottom surface of the first recess portion.

8. A check valve according to claim 1, wherein, when said valving element is fully moved and fully opened, the rear surface of said column portion of the valving element abuts against a portion of an inside surface of the recess portion so that the further movement of the valving element in the downstream direction is prevented, and
wherein said valving element and the valving element support are arranged such that, when the valving element is fully opened, an outer surface of the top portion of the head adjacent the column portion and an outer surface of the valving element support adjacent said mouth of the recess extend over a single smoothly extending curved surface.

9. A check valve according to claim 8, wherein the head of the valving element and the casing are arranged such that, when the valving element is fully opened, the outer surface of the top portion of the head adjacent the column portion and an inner surface of the casing at a position facing the outer surface of the top portion define together an annular, narrow upstream flow path portion which is smoothly contiguous with the upstream end of the narrow flow path portion.

10. A check valve according to claim 1, at said narrow flow path portion of the intermediate flow path, the outer periphery of the valving element support and the inner periphery of the casing each extend along an outwardly convex circular arc in the direction of the flow path.

11. A check valve according to claim 1, wherein said intermediate flow path further comprises a diffuser portion that is contiguous with the downstream side of said narrow flow path portion, and at the diffuser portion, the outer periphery of the valving element support and the inner periphery of the casing being gradually spaced away from each other toward the downstream side of the flow path.

12. A check valve according to claim 11, wherein, at the diffuser portion, the inner periphery of the casing has a uniform diameter, and said valving element support gradually decreases in outer diameter toward said downstream side.

13. A check valve according to claim 11, wherein said intermediate flow path further comprises a uniform flow path portion that is contiguous with the downstream side of the diffuser portion, said uniform flow path portion having a substantially uniform flow path area throughout its length.

14. A check valve according to claim 13, wherein, at said uniform flow path portion, the inner periphery of the casing and the outer periphery of the valving element support gradually decrease in diameter toward the downstream side of the flow path.

15. A check valve according to claim 11, a flow path area at a downstream side end of said diffuser portion is substantially equal to a flow path area at a downstream-side outlet port of said casing.

16. The check valve according to claim 1, wherein said valving element has a stem projecting rearwardly from the head, said valving element being movably supported by said valving element support at said stem.

17. The check valve of claim 16, wherein said recess of said valving element support has a hole formed in a bottom thereof, said stem of said valving element being fitted into and guided by said hole.

18. The check valve according to claim 17, wherein the hole that guides said stem is a through-hole, the stem of said valving element being fitted in said through-hole in a fluid-tight sealed state.

19. The check valve according to claim 18, wherein a distal end of said stem extends into a space at a side of said valving element support opposite to a bottom of said recess, said space communicating with the downstream side of said flow path.

20. The check valve according to claim 1, wherein the outer periphery of said valving element support has a first portion formed along an outwardly convex circular arc in the flow path direction, a second portion that is smoothly contiguous with said first portion and that gradually decreases in diameter toward the downstream side of said flow path, and a third portion that is smoothly contiguous with said second portion and substantially conical.

* * * * *